(12) United States Patent
Simon et al.

(10) Patent No.: US 12,103,709 B2
(45) Date of Patent: Oct. 1, 2024

(54) PRE-ASSEMBLY METHOD FOR AN AIRCRAFT TURBOMACHINE

(71) Applicant: SAFRAN TRANSMISSION SYSTEMS, Colombes (FR)

(72) Inventors: Adrien Louis Simon, Moissy-Cramayel (FR); Guillaume Julien Beck, Moissy-Cramayel (FR); Yohan Douy, Moissy-Cramayel (FR); Jordane Emile André Peltier, Moissy-Cramayel (FR); Jérémy David Seban, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 18/311,414

(22) Filed: May 3, 2023

(65) Prior Publication Data
US 2023/0356858 A1    Nov. 9, 2023

(30) Foreign Application Priority Data

May 4, 2022   (FR) ...................................... 22 04242

(51) Int. Cl.
*B64F 5/10*    (2017.01)
*F02C 7/36*    (2006.01)
*F16H 1/28*    (2006.01)

(52) U.S. Cl.
CPC .................. *B64F 5/10* (2017.01); *F02C 7/36* (2013.01); *F16H 1/28* (2013.01)

(58) Field of Classification Search
CPC ........................................................ B64F 5/10
See application file for complete search history.

(56) References Cited

U.S. PATENT DOCUMENTS

| | | | |
|---|---|---|---|
| 7,955,046 B2* | 6/2011 | McCune | F02C 7/36 415/230 |
| 7,989,733 B2* | 8/2011 | Bergerot | H05B 3/06 219/521 |
| 10,151,248 B2* | 12/2018 | Sheridan | F02K 3/04 |
| 2009/0081039 A1 | 3/2009 | McCune et al. | |
| 2020/0095890 A1 | 3/2020 | Becoulet et al. | |

FOREIGN PATENT DOCUMENTS

| | | |
|---|---|---|
| EP | 2584153 A2 | 4/2013 |
| WO | 2021058888 A1 | 4/2021 |

OTHER PUBLICATIONS

French Search Report issued in French Application No. 2204242, mailed on Dec. 22, 2022.

* cited by examiner

*Primary Examiner* — Courtney D Heinle
*Assistant Examiner* — John S Hunter, Jr.
(74) *Attorney, Agent, or Firm* — Bookoff McAndrews, PLLC

(57) ABSTRACT

A pre-assembly method for an aircraft turbomachine, including preliminarily assembling, outside the turbomachine, the following components with each other: a reduction gear configured to transmit a rotation between at least two rotors of the turbomachine while modifying the speed and torque ratio from one to the other of the at least two rotors, a shaft kinematically coupled to the reduction gear and configured to be kinematically coupled to one of the at least two rotors, a bearing support, and at least one bearing mounted on the bearing support and configured to rotatably support the shaft.

16 Claims, 3 Drawing Sheets

[Fig. 1]
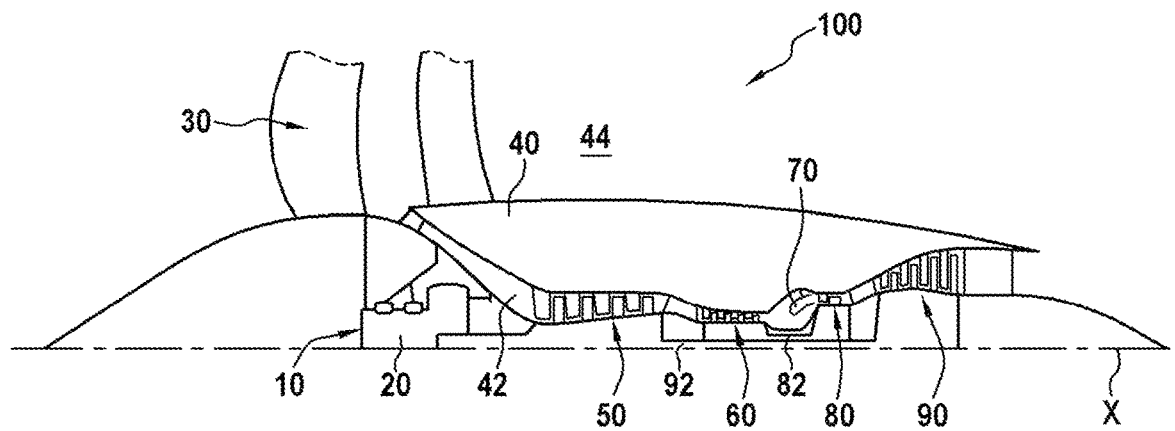
[Fig. 2]
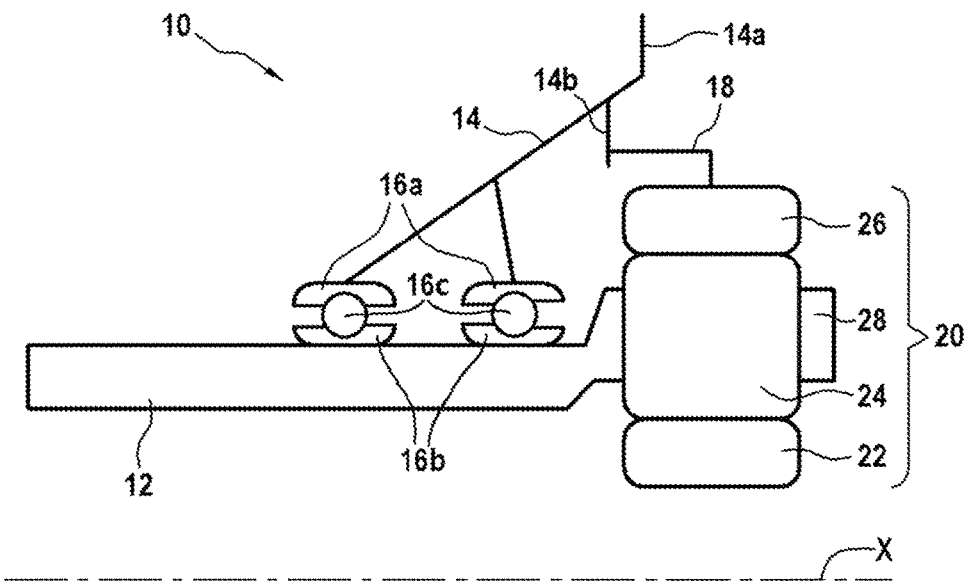

[Fig. 3]
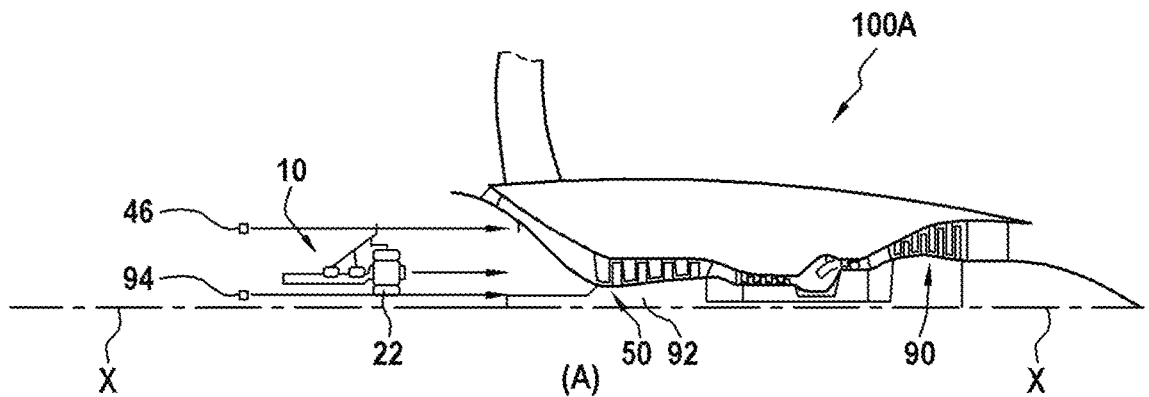
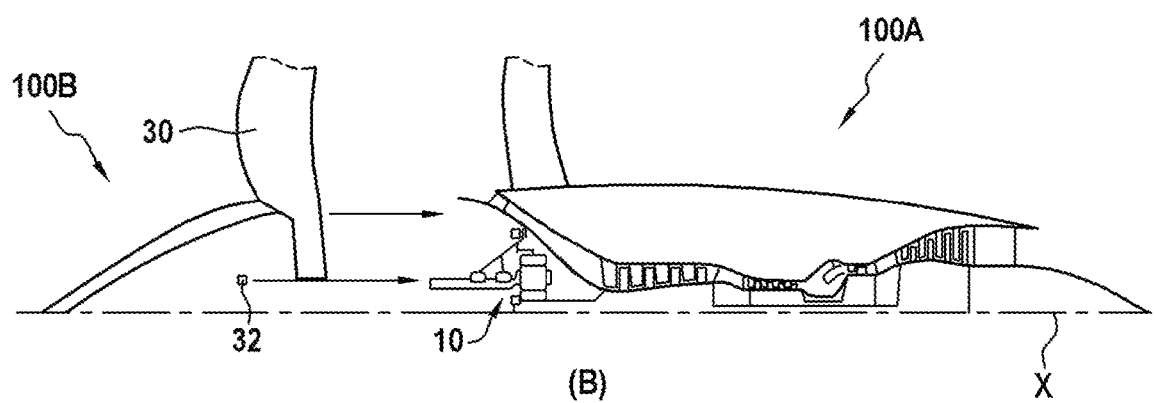
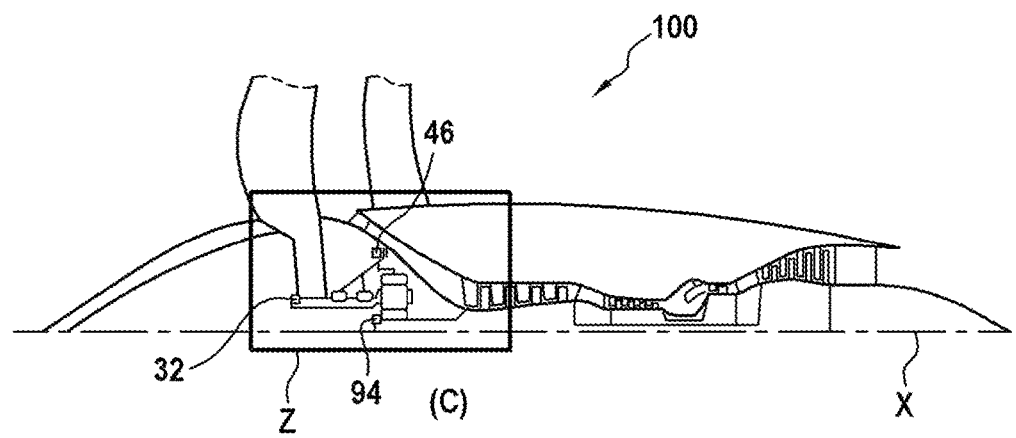

[Fig. 4]
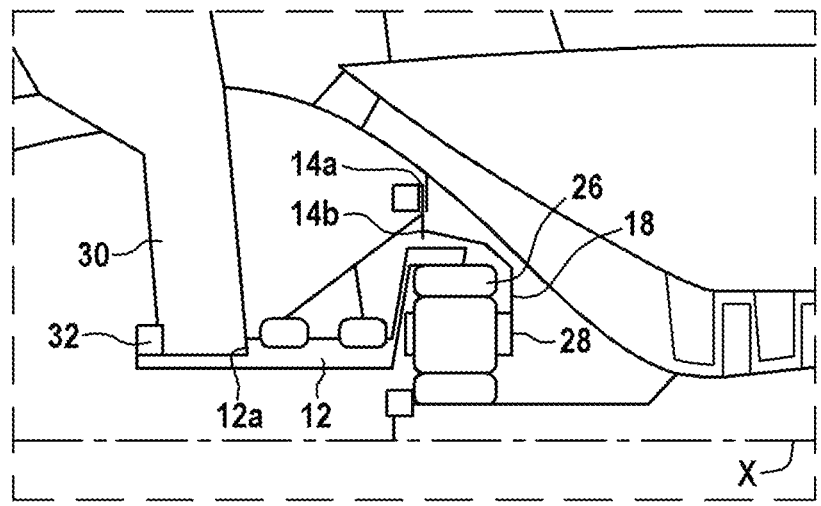
[Fig. 5]
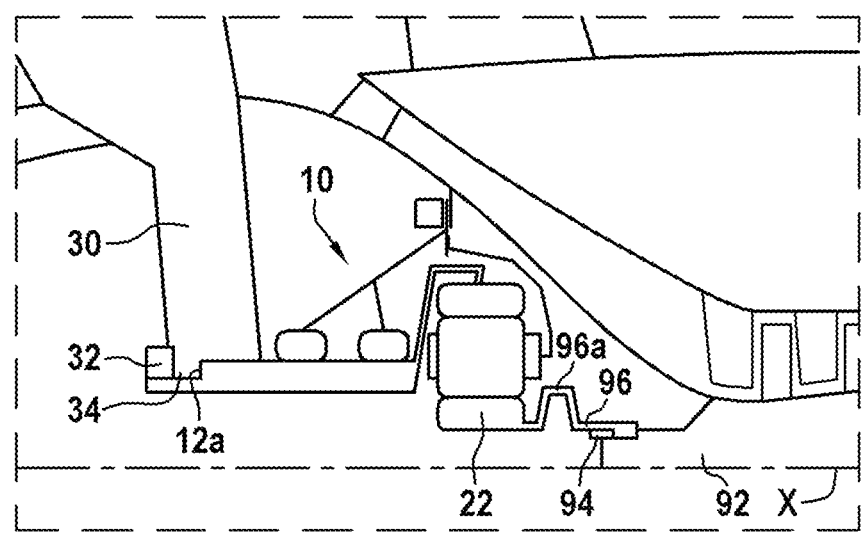

PRE-ASSEMBLY METHOD FOR AN AIRCRAFT TURBOMACHINE

This application claims priority from French patent application No. FR 2204242, filed on May 4, 2022, the contents of which are hereby incorporated herein in its entirety by this reference.

TECHNICAL FIELD

The present disclosure relates to the field of turbomachines for aircrafts, such as airplanes or helicopters, and more particularly aims to improve the method for mounting such turbomachines. To this end, the present disclosure relates to a pre-assembly method for an aircraft turbomachine.

TECHNICAL BACKGROUND

Aircraft turbomachines are complex devices comprising many components that are assembled together, generally starting with the innermost components of the turbomachine and going gradually towards the outermost components of the turbomachine. The mounting of each component requires accesses to be provided for inserting the component into the turbomachine and fixing it to the previously mounted components.

However, these accesses are generally only used for the mounting and the dismounting: they therefore form a design constraint which it would be advantageous to be able to overcome. In addition, some flanges, through which the torques of the components temporarily pass during the mounting, must be oversized while they only play a small role in the final assembly. Finally, the assembly of the successive components via small spaces requires special precautions not to damage the other components of the turbomachine, and can lead to levels of clamping, shrink-fitting, etc. lower than desired.

DISCLOSURE OF THE INVENTION

The present disclosure aims to overcome at least partly these drawbacks.

To this end, the present disclosure relates to a pre-assembly method for an aircraft turbomachine, comprising preliminarily assembling, outside the turbomachine, the following components with each other:
  a reduction gear configured to transmit a rotation between at least two rotors of the turbomachine while modifying the speed and torque ratio from one to another one of said at least two rotors,
  a shaft kinematically coupled to the reduction gear and configured to be kinematically coupled to one of said at least two rotors,
  bearing support, and
  at least one bearing mounted on the bearing support and configured to rotatably support the shaft.

Hereafter, and unless otherwise indicated, by "a" or "the" element (for example rotor, bearing, etc.), it is meant "at least one" or "the at least one" or "each" element. Conversely, the generic use of the plural may include the singular.

A reduction gear is a component having at least one input and one output, and making it possible to modify the speed of rotation and/or the torque between the at least one input and the at least one output. Thus, the speed/torque ratio of the input can differ from the speed/torque ratio of the output.

In the turbomachines used for the propulsion of the aircrafts, for example turbofan turbomachines, the reduction gear may aim to obtain a relatively slow speed of rotation to drive the propulsion unit (a first rotor) from a relatively fast speed of rotation of the turbine (a second rotor).

For example, the reduction gear can comprise a central pinion, called sun gear, a ring gear, external to the sun gear, and one or more pinions called planet gears which are engaged with the sun gear and the ring gear. The meshing of the different members can be mechanical or magnetic, for example. The planet gears can be supported by a frame called a planet (gear) carrier.

The shaft is kinematically coupled to the reduction gear and configured to be kinematically coupled to one of the rotors. Thus, the shaft participates in the kinematic connection and in the power transmission between the reduction gear and said rotor. In other words, the shaft can be driven by the reduction gear and configured to in turn drive one of the rotors, or the shaft can be configured to be driven by one of the rotors and in turn drive the reduction gear. Hereinafter, the shaft will also be referred to as the "first shaft".

Within the meaning of the present disclosure and unless otherwise indicated, the mention of a "first" element, such as a first shaft or a first rotor, does not necessarily imply the existence of a "second" element or, when appropriate, of order relation between the first and the second element. The ordinal qualifiers are, in this context, used solely for purposes of clarity and identification, without prejudging particular characteristics. Likewise, and vice versa, the mention of an element of higher (third, etc.) rank in no way implies that elements of lower rank, such as a possible second element, exist and/or comprise the characteristics that could have been presented elsewhere.

The bearing support is a support, fixed or movable in the reference frame of the turbomachine, which is provided to support one or more bearings, in this case the bearing(s) that rotatably support the shaft mentioned above. Thus, the shaft is rotatable in a reference frame linked to the bearing support.

The bearing is a component making it possible to support the shaft relative to the bearing support, while guaranteeing the shaft a freedom of movement, in this case in rotation, relative to the bearing support.

The preliminary assembling, also called pre-assembling, refers to assembling the components listed above prior to their assembly with the rest of the turbomachine. In other words, instead of introducing the reduction gear, the shaft, the bearing support and the bearing one by one into the turbomachine, by assembling each of these components with previously installed components, these components are first assembled together, outside the turbomachine, so that they form a module. This module, which is unitary, can be introduced into the turbomachine at once, and thus fixed to the turbomachine.

Thanks to the fact that the components are assembled outside the turbomachine, the mounting is facilitated and the risks of damage to the turbomachine are reduced. Furthermore, the assembling of the components being easier to control outside the turbomachine, the problems of chains of dimensions, misalignment and galvanic couples are reduced, as are the design constraints related to the assembling.

This results in gains in mass—less complex and not oversized fixing parts—, in reliability—better controlled mounting of the module and fewer flanges and fixing parts—in efficiency—the mounting is faster—and in modularity—the mounting and the dismounting are facilitated.

In some embodiments, the method comprises shrink-fitting the at least one bearing on the shaft and/or on the bearing support. Within the meaning of the present disclosure, the shrink-fitting designates the assembling of a first part around a second part, the first part being normally too small to accommodate the second part. This results in transverse forces at the interface between the two parts, and therefore significant friction which holds the two parts relative to each other. This prevents the bearing from slipping relative to the shaft and/or to the bearing support. The interface where shrink-fitting is performed is sometimes called shrink-fitting seat. The shrink-fitting can be carried out with all or part of the bearing concerned.

The shrink-fitting of the bearing on the shaft and/or on the bearing support ensures a good holding despite the high torques to which the bearing is subjected. Carrying out a shrink-fitting outside the turbomachine makes it possible to shrink-fit the bearing with higher levels of forces, and therefore better holding, than what would be possible if the shrink-fitting were carried out with at least one of the components already mounted on the turbomachine.

In some embodiments, the bearing support comprises an element for assembly with a casing of the turbomachine. Thus, the module obtained by the pre-assembly method can be fixed to a casing of the turbomachine via the bearing support. In other words, in the complete turbomachine, the bearing support is assembled directly with the casing of the turbomachine.

In some embodiments, the reduction gear comprises a stator member and the components further comprise an attachment element extending from the stator member to the bearing support so as to fix the stator member to the bearing support. The stator member can be one of the members of the reduction gear such as the ring gear or the planet gear carrier. The fact that the stator member is fixed by the attachment element to the bearing support makes this member fixed in the reference frame of the turbomachine. Therefore, the reduction gear is not a differential reduction gear, but can be a planetary reduction gear, in which the planet gear carrier is fixed, or an epicyclic reduction gear, in which the ring gear is fixed.

Thanks to the fact that an attachment element extends from the stator member to the bearing support so as to fix the stator member to the bearing support, the reduction gear itself is fixed twice relative to the bearing support, and no longer just via the shaft and the bearing, which facilitates the handling of the module as a unitary assembly. Furthermore, it is not necessary to fix the stator member directly on the casing or on another fixed portion of the turbomachine, since it will be fixed indirectly to the casing, via the bearing support. The final mounting of the module in the turbomachine is therefore facilitated.

In some embodiments, the attachment element extends from one side of the reduction gear to another side of the reduction gear. For example, the attachment element can extend between the front and the rear of the reduction gear, the front and the rear being defined along an axial direction.

The axis of the module refers to the axis of rotation of the rotating portions of the module, in particular of the reduction gear and/or of the shaft. The axial direction corresponds to the direction of the axis of the module and a radial direction is a direction perpendicular to this axis and intersecting this axis. Similarly, an axial plane is a plane containing the axis of the module, and a radial plane is a plane perpendicular to this axis. A circumference is understood as a circle belonging to a radial plane and whose center belongs to the axis of the module. A tangential or circumferential direction is a direction tangent to a circumference; it is perpendicular to the axis of the module but does not pass through the axis.

In this embodiment, the attachment element bypasses the reduction gear. The length necessary for this bypass provides certain flexibility to the attachment element, which makes it possible to accommodate the forces applied to the reduction gear, in particular in an axial direction.

In some embodiments, the components further comprise a second shaft kinematically coupled to the reduction gear. The second shaft can drive, or be driven by, a member of the reduction gear different from the member coupled to the first shaft. For example, the first shaft can form an output of the reduction gear, while the second shaft forms an input of the reduction gear, or vice versa. In operation, the speed of rotation of the first shaft can be different from the speed of rotation of the second shaft. Moreover, optionally, the first shaft and the second shaft can be provided on either side of the reduction gear, that is to say on opposite sides of the reduction gear.

In some embodiments, the shaft has an abutment (e.g. a stop) for the axial positioning of the corresponding rotor, the abutment being located such that the rotor is kept away from (e.g at a distance from) the at least one bearing. The corresponding rotor is the rotor which is kinematically coupled to said shaft. Thanks to the fact that the rotor is kept away from the bearing, the operation of the bearing is not affected.

In some embodiments, the at least one bearing is chosen among a ball bearing, a roller bearing or a tapered roller bearing. For example, the tapered roller bearings support increased load and can allow for better compactness.

In some embodiments, the rotor kinematically coupled to the shaft is a fan or a propeller of the turbomachine, or more generally a propulsion unit of the turbomachine. In these embodiments, the shaft (first shaft) is therefore a fan or propeller shaft, configured to rotate at relatively slow speeds with a high torque. Moreover, the second rotor, for example a turbine or a compressor, can be kinematically coupled to another member of the reduction gear, possibly via an ad hoc shaft (for example the aforementioned second shaft).

In some embodiments, at least some of the components have elements for fixing to parts of the turbomachine distinct from said components, the fixing elements all being provided on the same side of the module. It is recalled that the module designates the entity that is obtained by the pre-assembly method. It is understood that the parts of the turbomachine, to which the fixing elements are fixed, are distinct from the components of the module; in other words, the fixing elements are not fixing elements internal to the module, but with parts external to the module. Thanks to these provisions, the module can be assembled with the turbomachine more simply, because all the fixing operations are to be carried out on the same side. Preferably, this side, called accessible side, is the side opposite to the side, called non-accessible side, inserted first in the turbomachine.

In some embodiments, the components are preassembled so as to be dismountable from each other. Thus, during a maintenance operation, some components can be changed and others retained. Because the module forms a unitary assembly, it can be taken out of the turbomachine in a unitary manner, repaired or modified outside the turbomachine, then reinserted into the turbomachine again in a unitary manner.

The present disclosure also relates to a method for assembling an aircraft turbomachine, comprising obtaining a first turbomachine portion comprising a rotor, mounting a module obtained by the method as described previously on the first portion, and assembling a second portion comprising a rotor with the shaft of the module. Together, the first portion, the module and the second portion can form the turbomachine. The module allows the kinematic coupling between the first portion and the second portion, via the shaft which is coupled to the second portion and the reduction gear which is coupled to the first portion, or vice versa.

The present disclosure also relates to a module for an aircraft turbomachine, comprising the following components assembled with each other:
- a reduction gear configured to transmit a rotation between at least two rotors of the turbomachine while modifying the speed and torque ratio from one to another one of said at least two rotors,
- a shaft kinematically coupled to the reduction gear and configured to be kinematically coupled to one of said at least two rotors,
- a bearing support, and
- at least one bearing mounted on the bearing support and configured to rotatably support the shaft.

This module can be made by the pre-assembly method as described above. Thus, the module can have all or part of the characteristics detailed previously.

In some embodiments, the module further comprises first fixing elements configured to fix the shaft to a first one of said rotors, the first fixing elements being optionally provided at one end of the shaft opposite to the reduction gear, second fixing elements configured to fix the reduction gear to a second one of said rotors, and third fixing elements configured to fix the bearing support to a casing of the turbomachine.

BRIEF DESCRIPTION OF THE DRAWINGS

Other characteristics and advantages of the object of the present disclosure will emerge from the following description of embodiments, given by way of non-limiting examples, with reference to the appended figures.

FIG. 1 is a simplified longitudinal half-sectional view of a turbomachine according to one embodiment.

FIG. 2 schematically represents a module according to one embodiment, in longitudinal half-section.

FIG. 3 schematically illustrates steps of a method for assembling a turbomachine according to one embodiment.

FIG. 4 illustrates a first variant of the area Z of FIG. 3.

FIG. 5 illustrates a second variant of the area Z of FIG. 3.

DETAILED DESCRIPTION

A turbomachine 100 for an aircraft according to one embodiment is schematically represented in FIG. 1, in partial longitudinal half-section along the axis X. In this case, the turbomachine 100 is a twin-spool, turbofan engine. Indeed, the turbomachine 100 comprises a propulsion unit 30, in this case a fan, preferably a single fan, a casing 40 disposed downstream of the propulsion unit 30 and delimiting a primary flowpath 42 and a secondary flowpath 44. A low-pressure compressor (LP compressor) 50, a high-pressure compressor (HP compressor) 60, a combustion chamber 70, a high-pressure turbine (HP turbine) 80 and a low-pressure turbine (LP turbine) 90 are arranged in the primary flowpath 42, from upstream to downstream. Because the turbomachine 10 is a twin-spool turbomachine, it includes two kinematically independent rotating sets, namely on the one hand a high-pressure spool (HP spool), comprising the HP compressor 60 and the HP turbine 80, and on the other hand a low-pressure spool (LP spool) comprising the LP compressor 50 and the LP turbine 90. Each compressor 50, 60 is driven directly or indirectly by the turbine 80, 90 of the corresponding spool, the turbines 80, 90 being set in motion by the combustion gases coming from the combustion chamber 70.

However, the present disclosure can be transposed to the case of a single-spool turbomachine. The single spool would have the function of the HP spool for the operation of the turbomachine, but its role in relation to the reduction gear described below would be that of the LP spool. Furthermore, the present disclosure can be transposed to the case where the propulsion unit 30 is not a fan, but a propeller.

The casing 40 is fixed in the reference frame of the turbomachine and a fortiori of the aircraft, and the rotating portions, namely the movable bladed wheels of the propulsion unit 30, of the compressors 50, 60 and of the turbines 80, 90, rotate relative to the casing 40.

The rotation of the HP turbine 80 drives the HP compressor 60 via a HP shaft 82. The HP compressor 60 and the HP turbine 80 are therefore kinematically dependent on each other and, particularly here, rotate at the same speed. The HP shaft 82 can be supported relative to the casing by at least one bearing, for example a first bearing, typically a ball bearing, and a second bearing, typically a roller bearing.

Moreover, in this embodiment, the LP turbine 90 rotatably drives the LP compressor 50. The LP turbine 90 also rotatably drives the propulsion unit 30. More specifically, the turbomachine 100 comprises a transmission, here a reduction gear 20, coupled to the LP turbine 90 via a LP turbine shaft 92. In this embodiment, the LP turbine shaft 92 is arranged coaxially inside the HP shaft 82. Bearings can be provided to support the LP turbine shaft 92.

In this embodiment, the LP turbine shaft 92 directly drives the LP compressor 50, but as a variant the LP compressor 50 could be driven by the reduction gear 20.

Moreover, as schematized in FIG. 1, the reduction gear 20 is further coupled to the propulsion unit 30 in order to modify the transmission ratio of the speed of rotation between the LP turbine 90 and the propulsion unit 30. In other words, the reduction gear 20 is configured to transmit a rotation between at least two rotors of the turbomachine 100, in this case the LP turbine 90 and the propulsion unit 30, while modifying the speed and torque ratio from one to the other of said at least two rotors.

In doing so, the propeller 30 can be driven at relatively low speeds, which makes it possible to increase its diameter without exceeding critical speeds at blade tip. The turbomachines provided with a reduction gear can therefore have high bypass ratios, for example greater than or equal to 10, even 12 or even 14.

FIG. 2 illustrates in more detail a module 10 used in the context of the turbomachine 100 in order to facilitate its mounting. As indicated previously, the module 10 comprises the following components assembled with each other: the reduction gear 20 described previously, a shaft 12, a bearing support 14 and at least one bearing 16, in this case two bearings 16.

The shaft 12 is kinematically coupled to the reduction gear 20 and configured to be kinematically coupled to a rotor of the turbomachine 100, in this case to the propulsion unit 30. More generally, the shaft 12 can be an output shaft of the reduction gear 20, and could be kinematically coupled, alternatively, to the LP compressor 50.

As can be seen in FIG. 2, the bearing 16 is mounted on the bearing support 14 and is configured to rotatably support the shaft 12. In this case, as will be seen later, the bearing support 14 is intended to be fixed in the reference frame of the turbomachine. Thus, the bearing support 14 can comprise an element for assembly with a casing of the turbomachine 100, typically the casing 40. For example, the bearing support 14 can comprise a flange 14a provided for this purpose, the flange 14a being in this case a flange, e.g. an annular or non-annular flange, located radially outside the bearing support 14. The flange 14a can protrude radially outwardly of the bearing support 14. Other flanges can be provided as required, including a flange 14b. The flange 14b may or may not be annular. The flange 14b can protrude radially inwardly of the bearing support 14. More generally, the bearing support 14 can be mounted around the shaft 12.

The bearing(s) 16 can be chosen among ball bearings, roller bearings or tapered roller bearings. It is of course possible, in case of presence of several bearings, to mix the types of bearings. These bearings 16 usually each comprise an external race 16a, an internal race 16b and one or more rolling elements 16c allowing the rotation of the external race 16a relative to the internal race 16b. These rolling elements 16c can be balls, rollers or tapered rollers, without limitation.

Moreover, the reduction gear 20 comprises, in this embodiment, a sun gear 22, one or more planet gears 24 as well as a ring gear 26. Each planet gear 24 is engaged with the sun gear 22 and the ring gear 26, for example by contact (straight, helical or herringbone gear teeth, typically), friction or magnetic field. The planet gears 24 may be evenly distributed around the sun gear 22.

Moreover, the planet gears 24 are carried by a planet gear carrier 28, more specifically rotatably mounted on the planet gear carrier 28. The planet gear carrier 28 can be of any type suitable for the envisaged application, for example of the cage with cage holder type or of the monobloc type.

In this embodiment, the planet gear 24 is represented as a single-stage planet gear. However, if a reduction gear having several outputs or several inputs whose speed and torque ratios differ is desired, it is possible to provide that the planet gear has several stages, each stage being engaged with a different input/output, for example a different ring gear or a different sun gear. When appropriate, the present description may apply to one or more of the ring gears/sun gears.

In this embodiment, the reduction gear 20 is an epicyclic reduction gear, in the sense that the ring gear 26 is provided to be fixed in the reference frame of the turbomachine 100. In other words, the ring gear 26 forms a stator member of the reduction gear 20. Then, an attachment element 18 can be provided in order to fix this stator member, namely the ring gear 26, to the bearing support 14. In this case, the attachment element 18 extends from the ring gear 26 up to the bearing support 14, for example up to the flange 14b described above. Thus, the ring gear 26 can already be fixed within the module 10. The attachment element 18 can be fixed on the one hand to the ring gear 26 and on the other hand to the bearing support 14, by means known per se to those skilled in the art.

The attachment element 18 is directly fixed to the bearing support 14, and directly to the ring gear 26.

As indicated previously, the module 10 is the subject of a preliminary assembling, outside the turbomachine, of its various components with each other.

For example, the method for pre-assembling the module 10 may comprise assembling the planet gear carrier 28 with the shaft 12. The various members of the reduction gear 20 may be mounted with each other before or after this step.

Furthermore, the method for pre-assembling the module 10 may comprise mounting the bearings 16 on the shaft 12.

In this case, the pre-assembly method more specifically comprises mounting the internal races 16b of the bearings 16 on the shaft 12. This mounting may be carried out by shrink-fitting. The shrink-fitting can be facilitated by heating or cooling some parts in order to expand or contract them. The shrink-fitting may also require the application of the significant forces. These operations are facilitated by the fact that the shrink-fitting takes place outside the turbomachine, in particular on a dedicated tooling making it possible to reduce the risk of damage to the rest of the turbomachine during the assembling.

Furthermore, the method for pre-assembling the module 10 may comprise mounting the bearings 16 in the bearing support 14. In this case, the pre-assembly method more specifically comprises mounting the external races 16a of the bearings 16 in the bearing support 14. According to one example, the external races 16a can be shrink-fitted in the bearing support 14. The explanations relating to the shrink-fitting of the bearings 16 on the shaft 12 apply mutatis mutandis.

Furthermore, where appropriate, the method for pre-assembling the module 10 may comprise fixing the attachment element 18 on the stator member, here the ring gear 26, and on the bearing support 14.

These steps can be carried out in any order suitable for those skilled in the art, it being understood that, thanks to the fact that the module 10 is preassembled outside the turbomachine, access to the various components and to their respective fixing elements is facilitated. Furthermore, said fixing elements can be provided to be dismountable to facilitate the maintenance of the module 10.

Thus, the module 10 obtained can then be assembled in a unitary manner with the rest of the turbomachine 100, as will now be described with reference to FIG. 3.

FIG. 3 illustrates steps of a method for assembling an aircraft turbomachine such as the turbomachine 100 described above. The assembly method comprises obtaining a first portion 100A of the turbomachine. In this case, as illustrated in FIG. 3(A), the first portion 100A comprises most of the turbomachine, particularly the high and low-pressure spools defined above. However, in other embodiments, the first portion 100A could be more limited and comprise fewer components than those illustrated in FIG. 3(A). In any case, the first portion 100A may comprise a rotor, for example the LP turbine 90 or any rotary element connected thereto, for example the LP turbine shaft 92. The first portion 100A may form a unitary set.

The assembly method also comprises mounting the module 10 previously obtained on the first portion 100A, as illustrated by the arrows of FIG. 3(A). As mentioned above, the module 10 may be mounted in a unitary manner on the first portion 100A.

The mounting may comprise fixing the module 10 on the first portion 100A. In this case, the bearing support 14 is assembled with the casing 40, for example via the flange 14a, by appropriate fixing elements 46. For example, the fixing elements 46, or third fixing elements, can comprise splines with nuts, screws, bolts, etc. The fixing elements 46 can be disposed around the reduction gear 20, for example radially outside the reduction gear 20 and axially facing the reduction gear 20.

Moreover, the reduction gear 20 may be assembled with the aforementioned rotor. In this case, the sun gear 22 is fixed to the LP turbine shaft 92, so that the sun gear 22 is kinematically coupled to the LP turbine 90. Suitable fixing elements 94 may be used for this purpose. For example, the fixing elements 94, or second fixing elements, may comprise a spline.

All or part of the fixing elements 32, 46, 94 of the module 10 on the rest of the turbomachine may be dismountable.

The fixing elements 32, or first fixing elements, fix the shaft 12 to a first one of said rotors, in this case the propulsion unit 30. The first fixing elements 32 may be provided at one end of the shaft 12 opposite to the reduction gear 20, for example to clamp axially downstream the propulsion unit 30 against the shaft 12.

At the end of this mounting, the module 10 and the first portion 100A are assembled, as illustrated in FIG. 3(B). FIG. 3(B) also illustrates that the method then comprises assembling a second portion 100B with the module 20. More specifically, the second portion 100B comprises a rotor, in this case the propulsion unit 30, which is assembled with the shaft 12 of the module 20. Thus, the propulsion unit 30 may be kinematically coupled to the shaft 12, therefore to the planet gear carrier 28. Appropriate fixing elements 32 may be used for this purpose. For example, the fixing elements 32 may comprise a nut.

The turbomachine 100 illustrated in FIG. 3(C) results from this method.

As shown in FIG. 3, the fixing elements 32, 46, 94 are all provided on the same side of the module 20, namely the front side (on the left in FIG. 3). Thus, for fixing the components of the module 20 to the parts of the turbomachine distinct from these components, access to the fixing elements can always be done on the same side and therefore saves the fitter performing some operations blindly.

FIGS. 4 and 5 illustrate variants of the area Z of FIG. 3. In these figures, the elements corresponding or identical to those of the first embodiment will receive the same reference sign and will not be described again.

The variant of FIG. 4 differs from the embodiment previously described in that the reduction gear 20 is a planetary reduction gear and not an epicyclic reduction gear: indeed, it is the planet gear carrier 28 that is fixed (here fixed to the casing 40), while the ring gear 26 is movable, and more particularly kinematically coupled to the shaft 12.

However, this does not modify the assembling of the module 10 with the rest of the turbomachine 100, given that the module 10 behaves as a unitary set, and that the location of the fixing elements with the rest of the turbomachine 100 is not modified in this variant.

The other elements described above remain valid mutatis mutandis, by exchanging the ring gear 26 and the planet gear carrier 28 if necessary.

Furthermore, as shown in FIG. 4, the attachment element 18 must bypass the ring gear 26 to be fixed to the planet gear carrier 28. Therefore, the attachment element 18 extends from one side of the reduction gear 20, namely the rear side (on the right in FIG. 4) to another side of the reduction gear 20, namely the front side (on the left in FIG. 4). Although this is specified in the context of the variant of FIG. 4, such a characteristic could also be implemented in the embodiment of FIG. 2, by connecting the attachment element 18 to the ring gear 26 not radially outside the ring gear 26 as illustrated in FIG. 2, but at the rear of the ring gear 26, on the opposite side to the flange 14b of the bearing support 14.

Regardless of the foregoing, FIG. 4 illustrates that the shaft 12 has an abutment 12a for the axial positioning of the corresponding rotor, namely the propulsion unit 30. The abutment 12a is located such that the rotor (the propulsion unit 30) is kept away from the bearings 16, so as not to impede their operation. Moreover, the propulsion unit 30 is suitably held between the abutment 12a and the fixing element 32 which are located on either side of the propulsion unit 30 in the axial direction X.

In this case, the abutment 12a is formed by a shoulder of the shaft 12 configured to cooperate with the shape of the propulsion unit 30.

The variant of FIG. 5 differs from that of FIG. 4 in that the components of the module 10 further comprise a second shaft 96 kinematically coupled to the reduction gear 20. In this case, the second shaft 96 is kinematically coupled to the sun gear 22, and configured to be assembled with the LP turbine shaft 92. Furthermore, as shown in FIG. 5, the second shaft 96 is provided on one side of the reduction gear 20 opposite to the side of the shaft 12.

Providing a second shaft 96 as an intermediary between the second rotor, here the LP turbine 90, and the reduction gear 20, offers increased design flexibility. For example, this makes it possible to provide for a flexible portion 96a, e.g. a meandered portion capable of accommodating forces, here axial forces. In addition, this allows an offset of the fixing element 94 which is no longer at the level of the reduction gear 20, but at the level of the second shaft 96. This results in a better compactness of the reduction gear 20.

The second shaft 96 may be monobloc with the sun gear 22, for example formed in one piece, or as an integral part.

A priori, it is not necessary to provide for a dedicated bearing to support the second shaft 96, insofar as its rotation is already supported by the bearings that support the LP turbine shaft 92 to which the second shaft 96 is secured in rotation. However, such bearings may be envisaged.

When appropriate, the second fixing elements 94 may be located at an axial end of the second shaft 96 opposite to the reduction gear 20 to clamp axially downstream the second shaft 96 against the second rotor, namely the LP turbine shaft 92.

Moreover, FIG. 5 illustrates an axial holding of the propulsion unit 30 on the shaft 12 slightly different from that of FIG. 4: instead of providing that the fixing element 32 and the abutment 12a frame the propulsion unit 30 as a whole, the propulsion unit 30 is provided with an appendage 34 configured to be clamped between the abutment 12a and the fixing element 32. For example, the appendage forms a shoulder complementary to the shoulder that forms the abutment 12a.

In the variant of FIG. 5, the propulsion unit 30 is less compressed, while the variant of FIG. 4 provides greater flexibility on the clamping of the propulsion unit 30.

Although the present description refers to specific exemplary embodiments, modifications can be made to these examples without departing from the general scope of the invention as defined by the claims. Furthermore, individual characteristics of the different illustrated or mentioned embodiments can be combined in additional embodiments. Accordingly, the description and the drawings should be considered in an illustrative rather than restrictive sense.

The invention claimed is:

1. A pre-assembly method for an aircraft turbomachine, comprising preliminarily assembling, outside the turbomachine, the following components with each other:
   a reduction gear configured to transmit a rotation between at least two rotors of the aircraft turbomachine while modifying a speed and torque ratio from one to another one of said at least two rotors, the reduction gear comprising a stator member,
   a shaft kinematically coupled to the reduction gear and configured to be kinematically coupled to one of said at least two rotors, a bearing support provided with a flange located radially outside the bearing support, the flange being configured to receive fixing elements for dismountably connecting to a casing of the turbomachine, at least one bearing mounted on the bearing support and configured to rotatably support the shaft, and an attachment element extending from the stator member to the bearing support so as to fix the stator member to the bearing support, wherein the attachment element extends from one side of the reduction gear to another side of the reduction gear.

2. The method according to claim 1, comprising shrink-fitting the at least one bearing on at least one of the shaft and the bearing support.

3. The method according to claim 1, wherein the bearing support comprises an element for assembly with a casing of the aircraft turbomachine.

4. The method according to claim 1, wherein the components further comprise a second shaft kinematically coupled to the reduction gear.

5. The method according to claim 4, wherein the second shaft and the shaft are provided on either side of the reduction gear.

6. The method according to claim 1, wherein the shaft has an abutment for an axial positioning of the corresponding rotor, the abutment being located such that the rotor is kept away from the at least one bearing.

7. The method according to claim 1, wherein the at least one bearing is chosen among a ball bearing, a roller bearing or a tapered roller bearing.

8. The method according to claim 1, wherein the rotor kinematically coupled to the shaft is a fan or a propeller of the aircraft turbomachine.

9. The method according to claim 1, wherein at least some of the components have elements for fixing to parts of the aircraft turbomachine distinct from said components, the fixing elements all being provided on the same side of a module comprising the pre-assembled components.

10. A method for assembling an aircraft turbomachine, comprising obtaining a first turbomachine portion comprising a rotor, mounting the module obtained by the method of claim 9 on the first portion, and assembling a second portion comprising a rotor with the shaft of the module.

11. A module for an aircraft turbomachine, made by the pre-assembly method according to claim 1, comprising the following components assembled with each other:

the reduction gear configured to transmit a rotation between the at least two rotors of the aircraft turbomachine while modifying the speed and torque ratio from one to another one of said at least two rotors, the reduction gear comprising a stator member, the shaft kinematically coupled to the reduction gear and configured to be kinematically coupled to one of said at least two rotors, the bearing support, the at least one bearing mounted on the bearing support and configured to rotatably support the shaft, and the attachment element extending from the stator element to the bearing support so as to fix the stator member to the bearing support, wherein the attachment element extends from one side of the reduction gear to another side of the reduction gear.

12. The module for an aircraft turbomachine according to claim 11, the module further comprising first fixing elements configured to fix the shaft to a first one of said rotors, second fixing elements configured to fix the reduction gear to a second one of said rotors, and third fixing elements configured to fix the bearing support to a casing of the aircraft turbomachine.

13. The module for an aircraft turbomachine according to claim 12, wherein the first fixing elements are provided at one end of the shaft opposed to the reduction gear.

14. The method of claim 1, wherein the flange protrudes radially outwardly of the bearing support.

15. The method of claim 1, wherein the stator member is a ring gear of the reduction gear.

16. A pre-assembly method for an aircraft turbomachine, comprising preliminarily assembling, outside the turbomachine, the following components with each other:

a reduction gear configured to transmit a rotation between at least two rotors of the aircraft turbomachine while modifying a speed and torque ratio from one to another one of said at least two rotors, the reduction gear comprising a stator member, wherein the stator member is a ring gear of the reduction gear, a shaft kinematically coupled to the reduction gear and configured to be kinematically coupled to one of said at least two rotors, a bearing support, at least one bearing mounted on the bearing support and configured to rotatably support the shaft, and an attachment element extending from the stator member to the bearing support so as to fix the stator member to the bearing support, wherein the attachment element extends from one side of the reduction gear to another side of the reduction gear.

* * * * *